US012611720B2

(12) United States Patent
Kerekes

(10) Patent No.: US 12,611,720 B2
(45) Date of Patent: Apr. 28, 2026

(54) CHUCK JAW

(71) Applicant: Peter Csaba Kerekes, Rydalmere (AU)

(72) Inventor: Peter Csaba Kerekes, Rydalmere (AU)

(*) Notice: Subject to any disclaimer, the term of this patent is extended or adjusted under 35 U.S.C. 154(b) by 570 days.

(21) Appl. No.: 17/915,810

(22) PCT Filed: Apr. 1, 2021

(86) PCT No.: PCT/AU2021/050298
§ 371 (c)(1),
(2) Date: Sep. 29, 2022

(87) PCT Pub. No.: WO2021/195710
PCT Pub. Date: Oct. 7, 2021

(65) Prior Publication Data
US 2023/0158580 A1 May 25, 2023

(30) Foreign Application Priority Data

Apr. 3, 2020 (AU) ................................. 2020901034

(51) Int. Cl.
*B23B 31/16* (2006.01)
(52) U.S. Cl.
CPC .. *B23B 31/16275* (2013.01); *B23B 31/16279* (2013.01); *B23B 2260/004* (2013.01)
(58) Field of Classification Search
CPC ........ B23B 31/16008; B23B 31/16012; B23B 31/1605; B23B 31/16054; B23B 31/16087; B23B 31/16091; B23B 2231/22; B23B 2231/34; B23B 31/16275; B23B 31/16279; B23B 2260/004; B23B 31/107; B23B 5/00; B23B 31/10; B23B 31/102; B23B 31/1072; B23Q 3/12
See application file for complete search history.

(56) References Cited

U.S. PATENT DOCUMENTS 2,666,352 A * 1/1954 Philips .................. B25B 1/2452
279/151
5,735,534 A * 4/1998 Edwards ........... B23B 31/16279
279/123

FOREIGN PATENT DOCUMENTS

DE 102017110547 A1 * 11/2018 ....... B23B 31/16275

OTHER PUBLICATIONS

DE-102017110547-A1 PE2E translation (Year: 2018).*

* cited by examiner

*Primary Examiner* — Sunil K Singh
*Assistant Examiner* — Dustin James Trujillo
(74) *Attorney, Agent, or Firm* — OGC Law, LLC; Thomas Joseph

(57) ABSTRACT

There is disclosed a chuck jaw (10.1, 10.2, 10.3) for securing a workpiece (12) to a lathe chuck. The chuck jaw (10.1, 10.2, 10.3) includes a jaw body (16) adapted for operative mounting to the lathe chuck. The chuck jaw (10.1, 10.2, 10.3) further includes at least one holding element (18) operatively associated with the jaw body (16) and adapted to engage the workpiece (12). The at least one holding element (18) is moveable between (i) a release condition in which the holding element (18) is released from the workpiece (12), and (ii) an engaged position in which the holding element (18) engages a surface of the workpiece. The chuck jaw (10.1, 10.2, 10.3) further includes a clamping assembly (20) operatively adapted to secure the at least one holding element (18) in the engaged position.

3 Claims, 3 Drawing Sheets

CHUCK JAW

CROSS REFERENCE TO RELATED APPLICATIONS

The present application is a U.S. national stage application of PCT International Application No. PCT/AU2021/050298, filed Apr. 1, 2021, and published as PCT Publication WO/2021/195710 on Oct. 7, 2021, which claims priority to Australian Application No. AU 2020901034, filed on Apr. 3, 2020. The disclosures of all the foregoing applications are hereby incorporated by reference in their entirety into the present application.

FIELD

The invention concerns a chuck jaw. In one particular but non-exclusive aspect the invention concerns a chuck jaw for use in securing a workpiece with irregular contours to a lathe chuck.

BACKGROUND

A lathe is a machine tool that rotates a workpiece about an axis of rotation to perform machining operations such as cutting and turning to the workpiece. A lathe typically includes a horizontal beam which supports a headstock. The headstock includes spinning bearings which support a horizontal axle referred to as a spindle. The spindle is driven by a power source such as an integral electric motor. Many lathes employ CNC (computer numerical control) to process a piece of material. CNC is the automated control of machining tools by means of a computer and without the need of a manual operator.

A lathe further includes a chuck which is mounted to the spindle and rotates with the spindle. A chuck is a type of clamp which is adapted to hold the rotating workpiece during a machining operation. Many lathe chucks employ jaws, at times referred as dogs, that are arranged within a chuck body in a radially symmetrical pattern. The jaws are tightened, typically with the use of a chuck key, to secure a workpiece to the chuck. Once machining of the workpiece has been completed the workpiece can be removed from the chuck once the jaws have been loosened.

At times it may be required to hold a workpiece which potentially may be crushed by the jaws of the chuck. At other times it may be necessary to hold a workpiece with an irregular circumference or irregular contours. For such applications a tradesperson may employ tools which are referred to as soft jaws. The term "soft" is employed as soft jaws are produced from materials of lesser hardness than that of master chuck jaws. In one arrangement the soft jaws are adapted to be secured to the master chuck jaws.

Certain drawbacks are associated with soft jaws. One drawback includes that a tradesperson may require a large number of soft jaws to be stored to cater for workpieces having different circumferences/contours and the consequential cost implications. In other instances a tradesperson may be required to machine soft jaws having a specific shape suited to accommodate the unique contours of a particular workpiece. This may be a time-consuming process and result in a delay before machining of the workpiece can commence.

OBJECT

It is an object of the present invention to provide a chuck jaw which addresses or ameliorates one of more or the above disadvantages associated with existing soft jaws or at least to provide a useful alternative.

SUMMARY

According to a first aspect there is disclosed herein a chuck jaw for securing a workpiece to a lathe chuck, the chuck jaw including:
a jaw body adapted for operative mounting to the lathe chuck;
at least one holding element operatively associated with the jaw body and adapted to engage the workpiece, the at least one holding element being moveable between (i) a release condition in which the holding element is released from the workpiece, and (ii) an engaged position in which the holding element engages a surface of the workpiece; and
a clamping assembly operatively adapted to secure the at least one holding element in the engaged position.

Preferably the at least one holding element is a first holding element and the chuck jaw includes a plurality of holding elements each operatively adapted to engage the workpiece.

Preferably each respective holding element is moveable between (i) a release condition in which the respective holding element is released from the workpiece, and (ii) an engaged position in which the respective holding element engages a surface of the workpiece.

Preferably each holding element includes a holding element body and two holding element legs outwardly extending for the holding element body.

Preferably the two holding element legs define a holding slot between them.

Preferably the jaw body includes at least one jaw body bore for receiving a fastener to secure the jaw body to the lathe chuck.

Preferably the one jaw body bore is a first jaw body bore and the jaw body includes a second jaw body bore to receive a second fastener to secure the jaw body to the lathe chuck.

Preferably the clamping assembly includes a jaw body clamping member outwardly extending from the jaw body and a clamping element operatively associated with the jaw body clamping member, in use the at least one holding element being clamped between the jaw body clamping member and the clamping element.

Preferably the jaw body clamping member includes a clamping member hole operatively adapted to be located in register with a corresponding clamping element hole of the clamping element.

Preferably the holding slot of the at least one holding element is adapted to permit a clamp fastener to pass through the clamping member hole, through the holding slot and through the corresponding clamping element hole.

Preferably the jaw body clamping member includes a plurality of clamping member holes operatively adapted to be located in register with corresponding clamping element holes of the clamping element.

Preferably the holding slot of each of the plurality of holding elements is adapted to permit a clamp fastener to pass through the clamping member hole, through the holding slot and through the corresponding clamping element.

Preferably the jaw body defines a jaw body guide formation which is operatively adapted to couple with a complemental clamping element guide formation of the clamping element.

Preferably the jaw body guide formation is a jaw body slot and the clamping element guide formation is clamping element adapted to be received and held within the jaw body slot.

Preferably the jaw body defines a jaw body recess operatively adapted to receive a chuck fastener secured to a master jaw of the chuck.

Preferably the jaw body recess is adapted to receive a T-shaped nut coupled to the master jaw.

BRIEF DESCRIPTION OF THE DRAWINGS

Preferred embodiments of the invention will be described hereinafter, by way of examples only, with reference to the accompany drawings, wherein.

DESCRIPTION OF EMBODIMENTS

Figure 1:
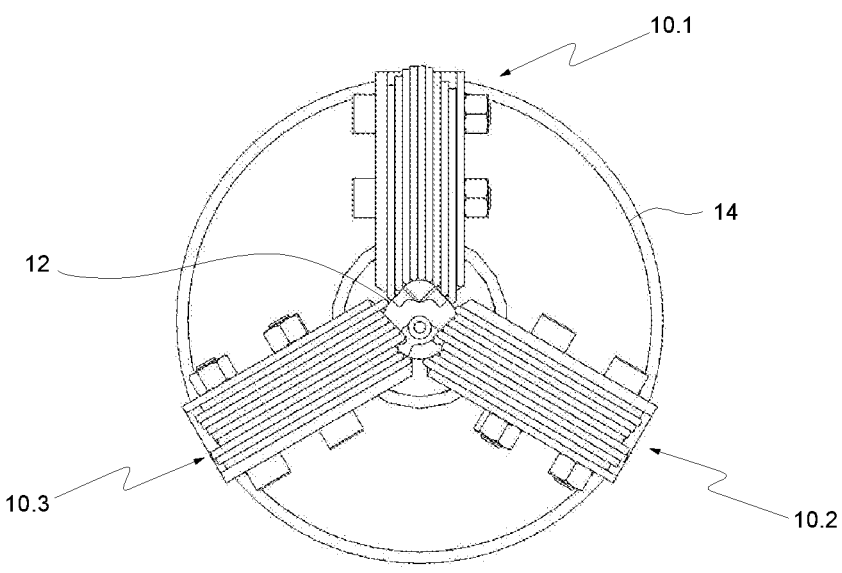
FIG. 1 is front view of a lathe chuck having three embodiment chuck jaws mounted thereto.

FIG. 1 shows three embodiment chuck jaws, generally indicated with the reference numerals 10.1, 10.2, 10.3, employed to secure a workpiece 12 to a lathe chuck 14. It is pointed out that the workpiece 12 has irregular contours and that the chuck jaws 10.1, 10.2, 10.3 are adapted to secure the workpiece 12 to the lathe chuck 14 as will become apparent from the below description.

Figure 2:
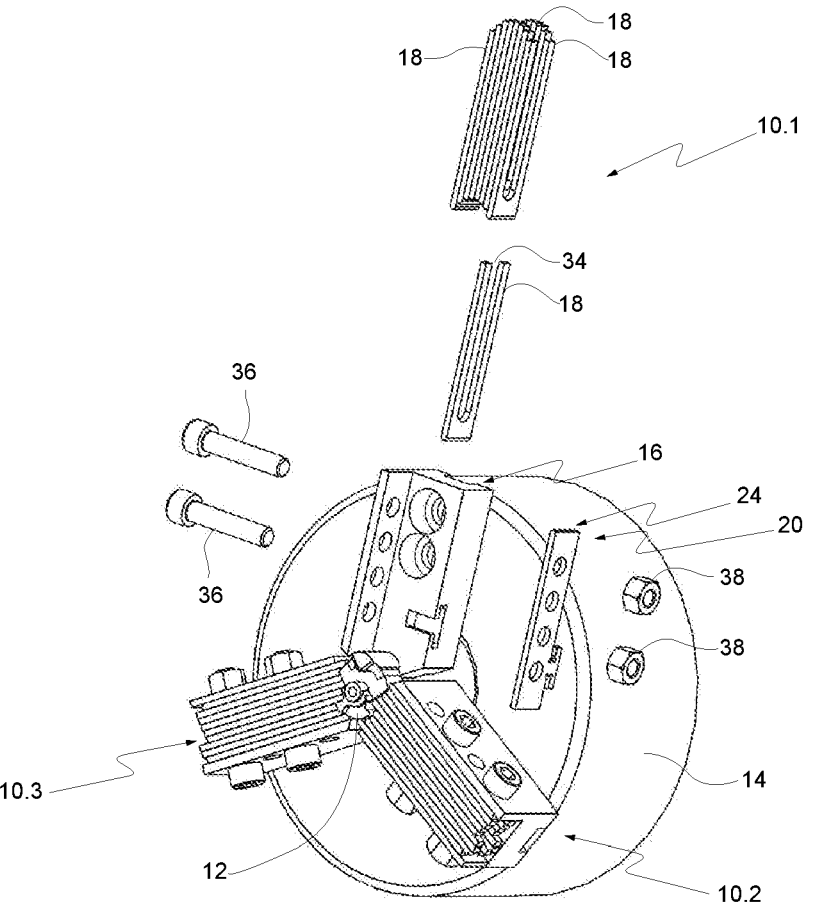
FIG. 2 is a front perspective view of the lathe chuck of FIG. 1 showing a partial exploded view of one of the embodiment chuck jaws.

FIG. 2 shows a partially exploded view of the chuck jaw 10.1. Although the description below will focus on the chuck jaw 10.1, the chuck jaws 10.2 and 10.3 are identical to the chuck jaw 10.1 and accordingly include the same components and operate in a manner corresponding to the chuck jaw 10.1.

The chuck jaw 10.1 first includes a jaw body 16 which is adapted for operative mounting to the lathe chuck 14. The chuck jaw 10.1 further includes a plurality of holding elements 18 operatively associated with the jaw body 16 and adapted to engage the workpiece 12. Each holding element 18 is moveable between (i) a release condition in which the respective holding element 18 is released from the workpiece 12, and (ii) an engaged position in which the respective holding element 18 engages a surface of the workpiece 12. In effect the holding elements 18 can be adjusted longitudinally relative to each other and the jaw body 16 so as to engage the outer contours of the irregular circumference of the workpiece 12. A skilled person will accordingly appreciate that the embodiment chuck jaws 10.1, 10.2, 10.3 can be employed to secure a range of differently configured workpieces by adjusting the holding elements 18 between release and engaged positions to accommodate a particular workpiece.

The embodiment chuck jaw 10.1 includes a clamping assembly, generally indicated with the reference numeral 20, operatively adapted to secure the holding elements 18 in their respective engaged positions. With the holding elements 18 secured in the engaged positions the workpiece 12 is secured to the lathe chuck 14 in order to undergo a machining process.

The embodiment clamping assembly 20 includes an oblong jaw body clamping member 22, shown in Figurers 2 and 3, outwardly extending from the jaw body 16. The clamping assembly 20 further includes an oblong clamping element 24, shown in FIGS. 2 and 8, operatively associated with the jaw body clamping member 22. In use the holding elements 18 are clamped between the jaw body clamping member 22 and the clamping element 24.

The jaw body clamping member 22 includes a plurality of clamping member holes 26 operatively adapted to be located in register with corresponding clamping element holes 28 of the clamping element 24.

Figure 6:
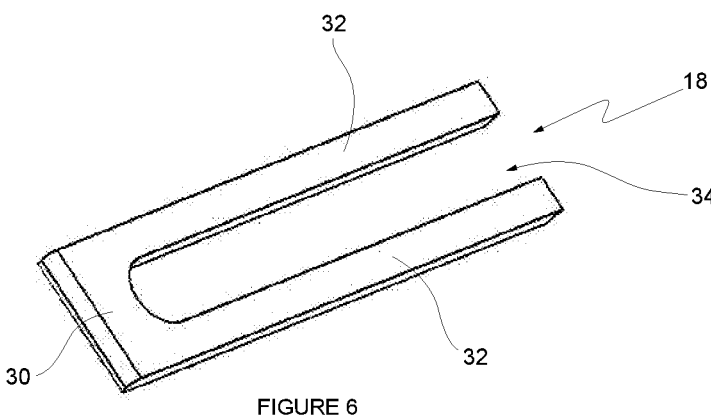
FIG. 6 is a perspective view of a holding element of the chuck jaw shown partially exploded in FIG. 2.
Figure 7:
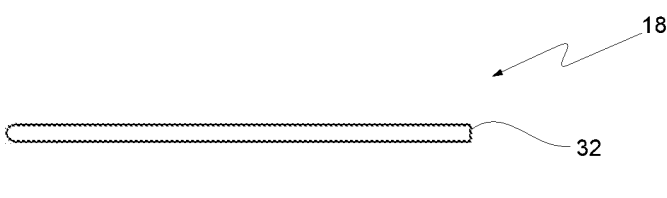
FIG. 7 is a side view of the holding element of FIG. 6.

Referring to FIGS. 6 and 7, each holding element 18 includes a holding element body 30 and two holding element legs 32 outwardly extending for the holding element body 30. The two holding element legs 32 define a holding slot 34 between them. The holding slot 34 of each holding element 18 is adapted to permit clamp fasteners 36 to pass through clamping member holes 26, through the holding slot 34 and through corresponding clamping element holes 28. In this embodiment the clamp fasteners 36 are bolts which are secured in position with mating nuts 38.

Figure 3:
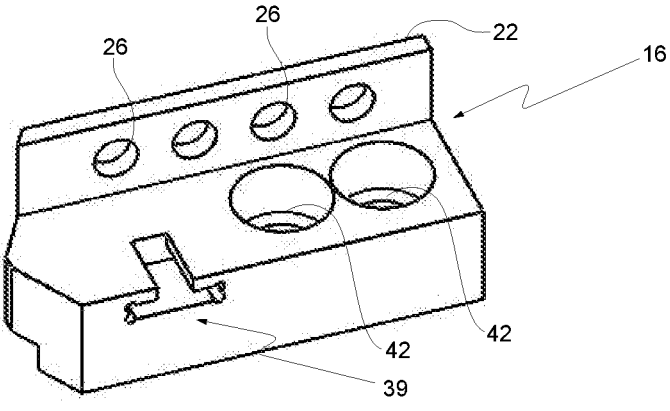
FIG. 3 is a perspective view of a jaw body of the chuck jaw shown partially exploded in FIG. 2.
Figure 4:
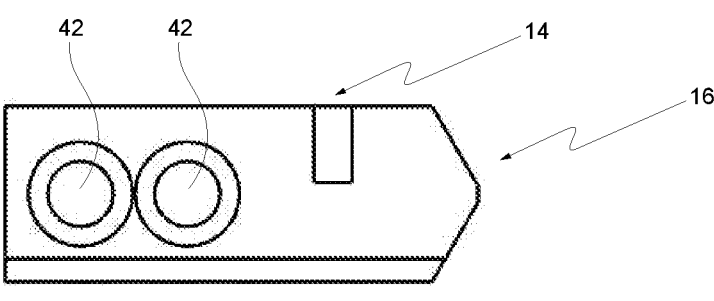
FIG. 4 is a top view of the jaw body of FIG. 3.
Figure 8:
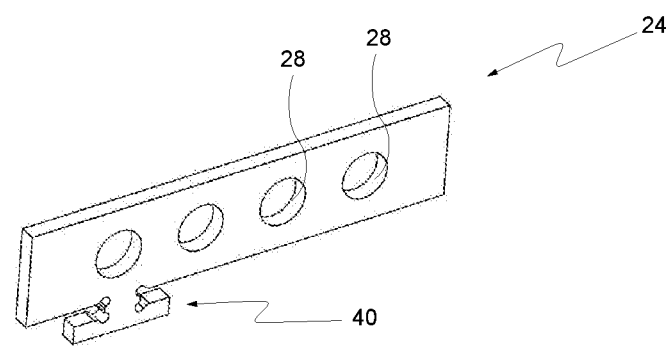
FIG. 8 is a perspective view of a clamping element of the chuck jaw shown partially exploded in FIG. 2.

Referring to FIGS. 3 and 8, the jaw body 16 defines a jaw body guide formation 39 operatively adapted to couple with a complemental clamping element guide formation 40 of the clamping element 24. In this embodiment the jaw body guide formation 39 is a T-shaped jaw body slot and the clamping element guide formation 40 is a T-shaped clamping element adapted to be received and held within the jaw body slot 39.

Figure 5:
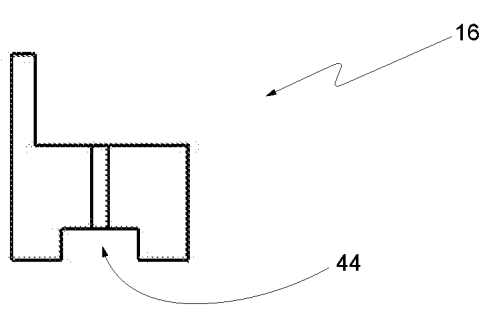
FIG. 5 is an end view of the jaw body of FIG. 3.

The jaw body 16 includes two countersunk jaw body bores 42 adapted to receive non-illustrated chuck fasteners to secure the jaw body 10.1 to the lathe chuck 14. In this embodiment the non-illustrated chuck fasteners are operatively adapted to secure the jaw body 16 to a corresponding non-illustrated master jaw of the lathe chuck 14. In this regard it is pointed out that the jaw body 16 defines a jaw body recess 44, shown in FIG. 5, which is operatively adapted to receive a non-illustrated chuck fastener secured to a master jaw of the lathe chuck 14. In this embodiment the jaw body recess 44 is adapted to receive a non-illustrated T-shaped nut coupled to the master jaw.

Although the invention has been described with reference to specific examples, it will be appreciated by those skilled in the art that the invention may be embodied in many other forms.

KEY TO REFERENCE NUMERALS

10.1 Chuck jaw
10.2 Chuck jaw
10.3 Chuck jaw
12 Workpiece
14 Lathe chuck
16 Jaw body
18 Holding element
20 Clamping assembly
22 Jaw body clamping member
24 Clamping element
26 Clamping member holes
28 Clamping element holes
30 Holding element body
32 Holding element legs
34 Holding slot

36 Clamp fastener
38 Nuts
39 Jaw body guide formation
40 Clamping element guide formation
42 Jaw body bore
44 Jaw body recess

The invention claimed is:

1. A chuck jaw for securing a workpiece to a lathe chuck, the chuck jaw including: a jaw body adapted for operative mounting to the lathe chuck; at least one holding element operatively associated with the jaw body and adapted to engage the workpiece, the at least one holding element being moveable between (i) a release condition in which the holding element is released from the workpiece, and (ii) an engaged position in which the holding element engages a surface of the workpiece; and a clamping assembly operatively adapted to secure the at least one holding element in the engaged position; wherein the at least one holding element is a first holding element and the chuck jaw includes a plurality of holding elements each operatively adapted to engage the workpiece; wherein each respective holding element is moveable between (i) a release condition in which the respective holding element is released from the workpiece, and (ii) an engaged position in which the respective holding element enrages a surface of the workpiece; and wherein each holding element includes a holding element body and two holding element legs outwardly extending for the holding element body; wherein the two holding element legs define a holding slot between them; wherein the jaw body includes at least one jaw body bore for receiving a fastener to secure the jaw body to the lathe chuck; wherein the one jaw body bore is a first jaw body bore and the jaw body includes a second jaw body bore to receive a second fastener to secure the jaw body to the lathe chuck; wherein the clamping assembly includes a jaw body clamping member outwardly extending from the jaw body and a clamping element operatively associated with the jaw body clamping member, in use the at least one holding element being clamped between the jaw body clamping member and the clamping element; wherein the jaw body clamping member includes a clamping member hole operatively adapted to be located in register with a corresponding clamping element hole of the clamping element; wherein the holding slot of the at least one holding element is adapted to permit a clamp fastener to pass through the clamping member hole, through the holding slot and through the corresponding clamping element hole; wherein the jaw body clamping member includes a plurality of clamping member holes operatively adapted to be located in register with corresponding clamping element holes of the clamping element; wherein the holding slot of each of the plurality of holding elements is adapted to permit a clamp fastener to pass through the clamping member hole, through the holding slot and through the corresponding clamping element; wherein the jaw body defines a jaw body guide formation which is operatively adapted to couple with a complemental clamping element guide formation of the clamping element; wherein the jaw body guide formation is a jaw body slot and the clamping element guide formation is clamping element adapted to be received and held within the jaw body slot.

2. A chuck jaw according to claim 1, wherein the jaw body defines a jaw body recess operatively adapted to receive a chuck fastener secured to a master jaw of the chuck.

3. A chuck jaw according to claim 2, wherein the jaw body recess is adapted to receive a T-shaped nut coupled to the master jaw.

* * * * *